United States Patent
Jiang

(10) Patent No.: US 11,601,530 B2
(45) Date of Patent: *Mar. 7, 2023

(54) METHOD AND DEVICE FOR GENERATING PROTOCOL DATA UNIT (PDU) PACKET

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 143 days.

This patent is subject to a terminal disclaimer.

(21) Appl. No.: 17/128,920

(22) Filed: Dec. 21, 2020

(65) Prior Publication Data

US 2021/0211524 A1     Jul. 8, 2021

Related U.S. Application Data

(63) Continuation of application No. 16/400,513, filed on May 1, 2019, now Pat. No. 10,911,577, which is a
(Continued)

(51) Int. Cl.
*H04L 12/28* (2006.01)
*H04L 12/50* (2006.01)
(Continued)

(52) U.S. Cl.
CPC ........... *H04L 69/161* (2013.01); *H04B 17/26* (2015.01); *H04L 69/03* (2013.01); *H04L 69/22* (2013.01);
(Continued)

(58) Field of Classification Search
CPC ..................................................... H04L 12/50
(Continued)

(56) References Cited

U.S. PATENT DOCUMENTS

2001/0033582 A1   10/2001   Sarkkinen et al.
2005/0213605 A1    9/2005   Kim et al.
(Continued)

FOREIGN PATENT DOCUMENTS

CN    101171806 A    4/2008
CN    101272519 A    9/2008
(Continued)

OTHER PUBLICATIONS

Notice of Reasons for Refusal dated Aug. 20, 2021, from the Japanese Patent Office issued in counterpart Japanese Application No. 2020-191717.
(Continued)

*Primary Examiner* — Dang T Ton
(74) *Attorney, Agent, or Firm* — Finnegan, Henderson, Farabow, Garrett & Dunner, L.L.P.

(57) ABSTRACT

The present disclosure relates to a method and device for generating a protocol data unit (PDU) packet. The method includes: acquiring a service data unit (SDU) packet, processing the SDU packet according to a size of a preset data packet, and generating a packet header and a data section of a PDU packet according to the processing result, the packet header and the data section constituting the PDU packet. The packet header omits a framing indication (FI) field and a resegmentation flag (RF) field and includes a preset field, and the preset field includes other fields than the FI field and the RF field that are redefined in a common packet header, or a target field that is newly added, a field length of the target field that is newly added being smaller than a total length of the FI field and the RF field.

18 Claims, 8 Drawing Sheets

Related U.S. Application Data continuation of application No. PCT/CN2016/104679, filed on Nov. 4, 2016.

(51) Int. Cl.

| | |
|---|---|
| *H04L 69/16* | (2022.01) |
| *H04B 17/26* | (2015.01) |
| *H04W 76/27* | (2018.01) |
| *H04L 69/22* | (2022.01) |
| *H04L 69/00* | (2022.01) |
| *H04L 69/324* | (2022.01) |
| *H04W 80/02* | (2009.01) |

(52) U.S. Cl.
CPC ........... *H04L 69/324* (2013.01); *H04W 76/27* (2018.02); *H04W 80/02* (2013.01)

(58) Field of Classification Search
USPC ........................................................ 370/329
See application file for complete search history.

(56) References Cited

U.S. PATENT DOCUMENTS

| | | | |
|---|---|---|---|
| 2006/0165045 | A1 | 7/2006 | Kim et al. |
| 2009/0008671 | A1 | 4/2009 | Ho |
| 2012/0140704 | A1 | 6/2012 | Zhao |
| 2016/0119102 | A1 | 4/2016 | Agiwal et al. |
| 2017/0288821 | A1* | 10/2017 | Baek ...................... H04L 47/34 |

FOREIGN PATENT DOCUMENTS

| | | |
|---|---|---|
| CN | 101364990 A | 2/2009 |
| CN | 101810025 A | 8/2010 |
| CN | 102265701 A | 11/2011 |
| CN | 102790659 A | 11/2012 |
| EP | 3059997 A1 | 8/2016 |
| JP | 2008259027 A | 10/2008 |
| JP | 4417418 B2 | 2/2010 |
| JP | 2010527544 A | 8/2010 |
| JP | 2011-517904 A | 6/2011 |
| KR | 20100075604 A | 7/2010 |
| RU | 2346402 C1 | 2/2009 |
| WO | WO 2008073043 A2 | 6/2008 |
| WO | WO 2008/136294 A1 | 11/2008 |
| WO | WO 2008136294 A1 | 7/2010 |
| WO | WO 2011061855 A1 | 5/2011 |
| WO | WO 2015139238 A1 | 9/2015 |
| WO | WO 2016064499 A1 | 4/2016 |

OTHER PUBLICATIONS

3GPP Technical Specification Group Radio Access Network; Evolved Universal Terrestrial Radio Access (E-UTRA); Radio Link Control (RLC) protocol specification (Release 9) 3GPP TS 36.322 V9.3.0 Sep. 30, 2010 (Sep. 2010).

International Search Report and Written Opinion of the International Searching Authority of PCT Application No. PCT/CN2016/104679, dated Feb. 23, 2017, issued by the National Intellectual Property Administration, PRC, Beijing, China.

First Office Action dated Dec. 22, 2017, in counterpart Chinese Application No. 201680001288.1 and English translation thereof.

Second Office Action dated Mar. 12, 2018, in counterpart Chinese Application No. 201680001288.1 and English translation thereof.

Russian search report of application No. 2019115123/08, dated Jan. 17, 2020.

First Office Action of Russian application No. 2019115123/08, dated Jan. 31, 2020.

Panasonic, "RLC UM PDU header structure", R2-074863, 3GPP TSG RAN WG2 #60, Nov. 5-9, 2007, Jeju, Korea, 2 pages.

Notice of Reasons for Refusal of Japanese application No. 2019-522799 dated Mar. 31, 2020.

Partial supplementary European search report of counterpart EP application No. 16920530.9 dated Mar. 18, 2020.

Alcatel-Lucent, et al;"RLC PDU re-segmentation", R2-073589, 3GPP TSG RAN WG2 #59, Aug. 20-24, 2007, Athens, Greece, 4 pages.

Samsung, "Segment Offset-based Segmentation for NR", R2-166511, 3GPP TSG RAN WG2 Meeting #95bis, Kaohsiung. Taiwan, Oct. 10-14, 2016, 4 pages.

European Search Report of European Application No. 16920530.9, dated Jun. 29, 2020.

Russian Acceptance Decision of Russian Application No. 2019115123/28, dated May 20, 2020.

Korean Notification of Reasons for Refusal of Korean Application No. 10-2019-7015949, dated Apr. 28, 2020.

Japanese Office Action dated Aug. 12, 2020, in counterpart Japanese Application No. 2019-522799.

Brazilian Preliminary Office Action dated Aug. 24, 2020, in counterpart Brazilian Application No. 112019008903-9.

Examination Report of Indian Application No. 201937020318 dated Nov. 24, 2020.

Notification of Reason for Refusal of Korean Application No. 10-2019-7015949 dated Nov. 27, 2020.

\* cited by examiner

METHOD AND DEVICE FOR GENERATING PROTOCOL DATA UNIT (PDU) PACKET

CROSS-REFERENCE TO RELATED APPLICATIONS

This application is a continuation of U.S. application Ser. No. 16/400,513, filed May 1, 2019, which is a continuation of International Application No. PCT/CN2016/104679, filed Nov. 4, 2016, the entire contents of all of which are incorporated herein by reference.

TECHNICAL FIELD

The present disclosure relates to the field of communication technologies, and in particular, to a method and device for generating protocol data unit (PDU) packet.

BACKGROUND

A radio link control (RLC) layer in long term evolution (LTE) is located between a packet data convergence protocol (PDCP) layer and a media access control (MAC) layer. The data packet exchanged between the RLC layer and the PDCP layer is called a service data unit (SDU) packet, and the data packet exchanged between the RLC layer and the MAC layer is called a protocol data unit (PDU) packet.

In actual implementation, the MAC layer can specify the size of the PDU packet, and generally, the size of the SDU packet received by the RLC layer is not equal to the size of the PDU packet specified by the MAC layer. Therefore, the RLC layer can process the received SDU packet, for example, the SDU packet can be segmented, cascaded or the like. After processing the SDU packet, the RLC layer can generate a PDU packet of the specified size. The PDU packet includes a packet header and a data section, and the packet header includes a data/control (D/C) field, a resegmentation flag (RF) field, a polling bit (P) field, a framing indication (FI) field, a length indication (LI) field, an extension bit (E) field, a sequence number (SN) field, a last segment flag (LSF) field, a segmentation offset (SO) field and the like.

SUMMARY

The present disclosure provides a method and device for generating a protocol data unit (PDU) packet.

According to a first aspect of the present disclosure, there is provided a method for generating a protocol data unit (PDU) packet. The method comprises: acquiring a service data unit (SDU) packet; processing the SDU packet according to a size of a preset data packet; and generating a packet header and a data section of a PDU packet according to a processing result, the packet header and the data section constituting the PDU packet, wherein the packet header omits a framing indication (FI) field and a resegmentation flag (RF) field and comprises a preset field, and the preset field comprises a target field that is newly added, a field length of the target field that is newly added being smaller than a total length of the FI field and the RF field.

According to a second aspect of the present disclosure, there is provided a device for generating a protocol data unit (PDU) packet. The device comprises: a processor; and a memory for storing a processor-executable instruction, wherein the processor is configured to: acquire a service data unit (SDU) packet; process the SDU packet according to a size of a preset data packet; and generate a packet header and a data section of a PDU packet according to a processing result, the packet header and the data section constituting the PDU packet, wherein the packet header omits a framing indication (FI) field and a resegmentation flag (RF) field and comprises a preset field, and the preset field comprises a target field that is newly added, a field length of the target field that is newly added being smaller than a total length of the F field and the RF field.

According to a third aspect of the present disclosure, there is provided a non-transitory computer-readable storage medium having stored therein instructions that, when executed by a processor of a device, cause the device to perform a method for generating a protocol data unit (PDU) packet. The method comprises: acquiring a service data unit (SDU) packet; processing the SDU packet according to a size of a preset data packet; and generating a packet header and a data section of the PDU packet according to a processing result, the packet header and the data section constituting the PDU packet, wherein the packet header omits a framing indication (FI) field and a resegmentation flag (RF) field and comprises a preset field, and the preset field comprises a target field that is newly added, a field length of the target field that is newly added being smaller than a total length of the FI field and the RF field.

It is to be understood that both the foregoing general description and the following detailed description are exemplary only and are not restrictive of the present disclosure.

BRIEF DESCRIPTION OF THE DRAWINGS

The drawings herein are incorporated in and constitute a part of this specification of the present disclosure, showing embodiments consistent with the present disclosure, and explaining the principles of the present disclosure together with the description.

DETAILED DESCRIPTION

Figure 1:
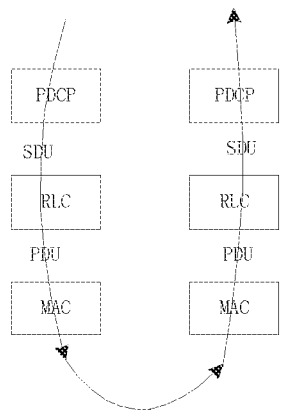
FIG. 1 is a schematic diagram of an implementation environment according to various embodiments of the present disclosure.

Hereinafter, exemplary embodiments will be described in detail. The embodiments are shown in the drawings. In the following description when referring to the drawings, the same numerals in different drawings denote the same or similar elements unless otherwise indicated. The following exemplary embodiments are not representative of all embodiments consistent with the present disclosure. Rather, they are merely examples of devices and methods consistent with some aspects of the present disclosure as detailed in the appended claims.

An implementation environment for various embodiments of the present disclosure may be long term evolution (LTE). In the LTE, when a transmitting end transmits data to a receiving end, the RLC layer at the transmitting end, referring to FIG. 1, can receive the SDU packet from the PDCP layer. Since the RLC layer interacts with the MAC layer through the PDU packet, and the size of the received SDU packet is generally different from the size of the PDU packet specified by the MAC layer, the RLC layer needs to process the received SDU packet by, for example, segmenting, cascading, etc., then generates the PDU packet according to the processing result, and the generated PDU packet is transmitted to the receiving end. Wherein, the PDU packet includes a packet header and a data section. After receiving the PDU packet, the RLC layer at the receiving end decapsulates out the SDU according to the packet header of the PDU packet and forwards the SDU to an upper layer.

The transmitting end can be user equipment (UE) or a base station, and correspondingly, the receiving end can also be a base station or UE, which is not limited herein.

Functions of the RLC layer are implemented by an RLC entity, and the RLC entity can be configured as one of the following three modes.

The first mode is a transparent mode (TM), and this mode can be deemed as an empty RLC since this mode only provides a data transparent transmission function.

The second mode is an unacknowledged mode (UM), and this mode provides all RLC functions except retransmission and resegmentation.

The third mode is an acknowledged mode (AM), and this mode provides all RLC functions by error detection and retransmission.

The method for generating PDU packet provided by various embodiments of the present disclosure may be used under UM and AM.

Figure 2:
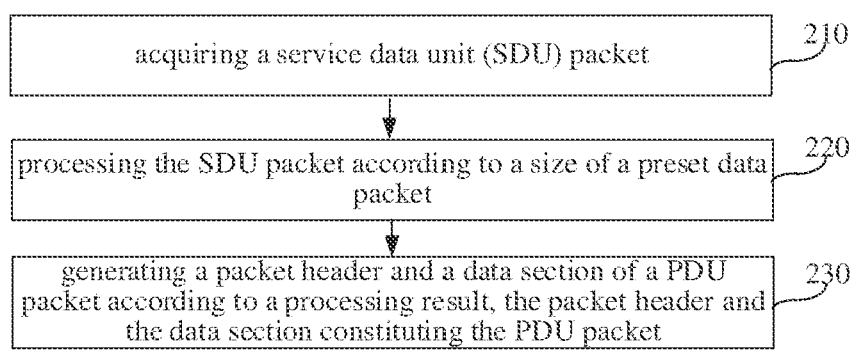
FIG. 2 is a flow chart of a method for generating a PDU packet according to one exemplary embodiment of the present disclosure.

FIG. 2 is a flow chart of a method for generating a PDU packet according to one exemplary embodiment of the present disclosure, and the method for generating a PDU packet can include following steps.

In step 210, an SDU packet is acquired.

In step 220, the SDU packet is processed according to a size of a preset data packet.

In step 230, a packet header and a data section of the PDU packet are generated based on the processing result, the packet header and the data section constituting the PDU packet.

In the embodiment, the packet header omits an FI field and an RF field but includes a preset field, and the preset field includes other fields than the FI field and the RF field that are redefined in a common packet header, or a target field that is newly added. The field length of the target field that is newly added is smaller than the total length of the FI field and the RF field.

In the method for generating a PDU packet provided by this embodiment, a PDU packet including a packet header and a data section is generated, and the packet header omits the FI field and the RF field but includes the preset field, wherein the preset field includes other fields than the FI field and the RF field already existing in the common packet header or a target field that is newly added and has a length smaller than the total length of the FI field and the RF field. In this way, the problem that the overhead occupied by the packet header of the PDU packet as generated in the related art is large can be solved, and an effect of directly omitting the FI field and the RF field or adding a target field having a shorter length while omitting the FI field and the RF field, thereby reducing the length of the packet header and saving the overhead of the packet header can be achieved.

The preset field includes other fields than the FI field and the RF field that are redefined in the common packet header, or a target field that is newly added, wherein the field length of the target field that is newly added is smaller than the total length of the FI field and the RF field. The above two cases will be explained separately below in different embodiments.

Figure 3A:
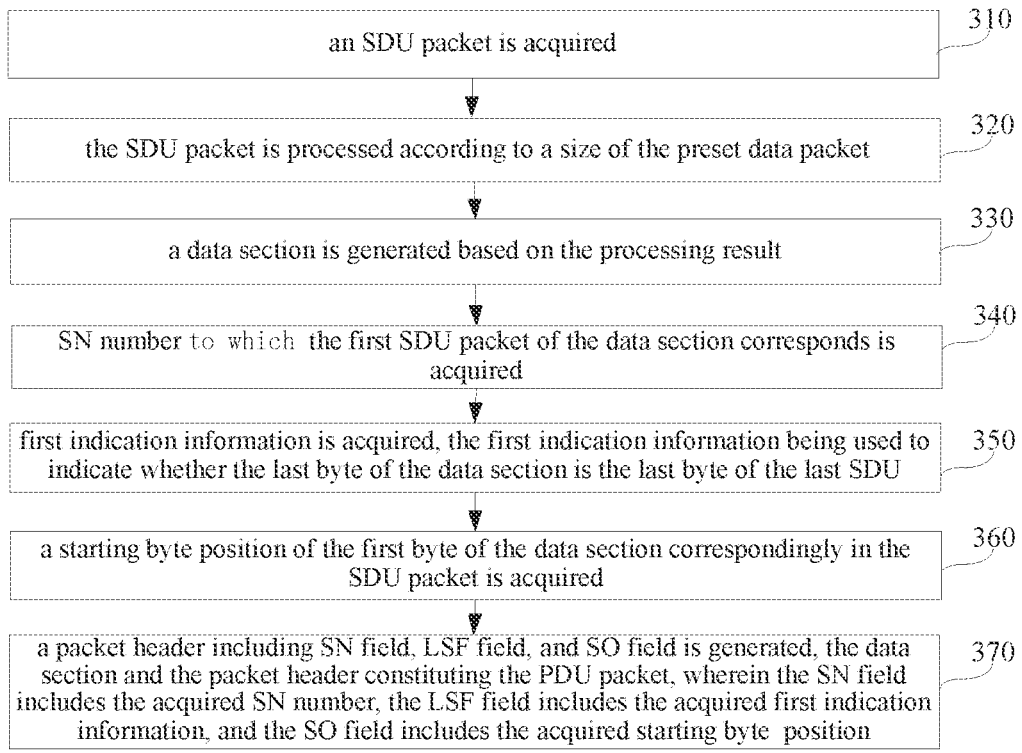
FIG. 3A is a flow chart of a method for generating a PDU packet according to another exemplary embodiment of the present disclosure.

FIG. 3A is a flow chart of a method for generating a PDU packet according to one exemplary embodiment of the present disclosure. In this embodiment, the preset field is the other fields in the common packet header. As shown in FIG. 3A, the method for generating a PDU packet can include following steps.

In step 310, an SDU packet is acquired.

When the transmitting end needs to transmit the data, the RLC entity can receive the SDU packet from the PDCP layer.

In step 320, the SDU packet is processed according to a size of the preset data packet.

The size of the preset data packet is the size of the PDU packet specified by the MAC layer.

In some embodiments, since the size of the received SDU packet is generally different from the size of the PDU packet specified by the MAC layer, the RLC entity generally needs to process the SDU packet. Wherein, the processing performed to the SDU packet includes one or both of segmentation and cascade, which is not limited in this embodiment.

In some embodiments, when the size of the SDU packet is greater than the size of the data section in the preset data packet, the RLC entity can segment the SDU packet. For example, when the size of the SDU packet is 100 bytes, the size of the preset data packet is 60 bytes, and the packet header needs to occupy 10 bytes, the RLC entity can segment the SDU packet into two SDU segments, each SDU segment being 50 bytes. For another example, when the size of the SDU packet is 100 bytes, the size of the preset data packet is 70 bytes, and the packet header needs to occupy 10 bytes, the RLC entity can segment the SDU packet into two SDU segments as 60 bytes and 40 bytes. Then, the RLC entity can further cascade the 40-byte SDU segment and the 20-byte SDU segment of the next SDU packet, configure the 60 bytes in the next SDU packet to be independent, and cascade the last 20 bytes of the SDU segment of the next SDU packet and the 40 bytes of the further next SDU packet, and so forth.

Figure 3B:
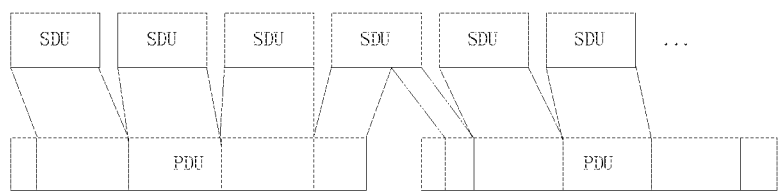
FIG. 3B is a schematic diagram of processing a SDU packet according to an exemplary embodiment of the present disclosure.

When the size of the SDU packet is smaller than the size of the data section in the preset data packet, the RLC entity can segment and cascade the SDU packet. For example, when the size of the SDU packet is 30 bytes, the size of the preset data packet is 120 bytes, and the packet header needs to occupy 10 bytes, the RLC entity, referring to FIG. 3B, can cascade three SDU packets and the first 20 bytes of the fourth SDU packet, and cascade the last 10 bytes of the fourth SDU packet, the fifth SDU packet, the sixth SDU packet, the seventh SDU packet, and the first 10 bytes of the eighth SDU packet, and so forth.

When the size of the SDU packet is equal to the size of the data section in the preset data packet, no processing is required.

In step 330, a data section is generated based on the processing result.

As can be seen from the processing to the SDU packet, the data section can be a complete SDU, an SDU segment, or a combination thereof. In addition, when the data section is the combination of the complete SDU and the SDU segment, only the first and the last data section can be the SDU segment.

In step 340, an SN number to which the first SDU packet of the data section corresponds is acquired.

When the SDU is cascaded, the RLC entity can acquire the SN number to which the first SDU packet of the data section corresponds.

For example, when the size of the SDU packet is 10) bytes, and the size of the preset packet is 120 bytes, the RLC entity can acquire the SN number of the first SDU packet, such as SN=0, since the data section can include the entire contents of the first SDU packet and the first 10 bytes of the second SDU packet.

In step 350, first indication information is acquired, the first indication information being used to indicate whether the last byte of the data section is the last byte of the last SDU.

The RLC entity can detect whether the last byte of the data section is the last byte of the last SDU. When the detection result is no, the first indication information, such as '0', for indicating NO is generated, and when the detection result is YES, the first indication information, such as '1', for indicating YES is generated.

For example, if still the size of the SDU packet is 100 bytes, and the size of the preset packet is 120 bytes, the RLC entity can generate '0', since the last byte of the data section is the $10^{th}$ byte of the second SDU packet rather than the last byte of the SDU packet.

In step 360, a starting byte position of the first byte of the data section correspondingly in the SDU packet is acquired.

In order to enable the receiving end to decapsulate the SDU packet after receiving the PDU packet, the RLC entity can acquire the starting byte position of the first byte of the data section in the SDU packet.

In step 370, a packet header including an SN field, an LSF field, and an SO field is generated, the data section and the packet header constituting the PDU packet, wherein the SN field includes the acquired SN number, the LSF field includes the acquired first indication information, and the SO field includes the acquired starting byte position.

The packet header omits the FI and the RF field but may further include in some embodiments the other fields in the common packet header, such as, a D/C field, an E field, an LI field, a P field, a padding field, and the like. Wherein the padding field is used to enable the data header to be integer bytes when the packet header is non-integer bytes. In an embodiment, when the method for generating a PDU packet is used under the UM, the packet header does not include the D/C field and the P field, which is not limited by this embodiment.

Figure 3C:
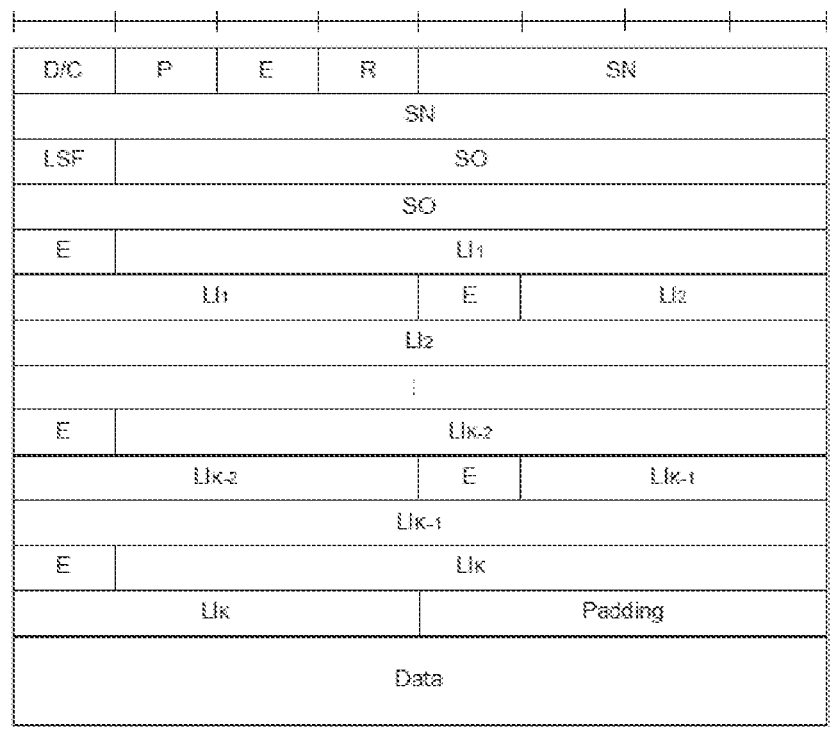
FIGS. 3C and 3D are schematic diagrams of a structure of a PDU packet according to exemplary embodiments of the present disclosure.

In some embodiments, the packet header can include a fixed header and an extended header. FIG. 3C is a schematic diagram of a structure of a packet header according to one exemplary embodiment. In addition, in conjunction with FIG. 3C, the fixed header starts from the starting position of the header to the SO field, and the extended header starts from the E field to the end. The SN field of the fixed header is the SN number to which the first SDU of the data section corresponds; the SO field of the fixed header indicates the starting byte position of the first byte of the data section correspondingly in the SDU; and the LSF field of the fixed header indicates whether the last byte of the data section corresponds to the last byte of the last RLC SDU. The R field is a reserved field, and it may or may not be present in some embodiments, which is not limited by this embodiment. When extension bit 'E' equals to 1, it indicates that there is an extended header after the fixed header, that is, the E field and the LI field. When the E field of the extended header equals to 1, it indicates that one more extended header exists after the extended header, and so forth. The LI field of the first extended header is used to indicate the number of bytes of the first SDU/SDU segment included in the data section; the LI field of the second extended header indicates the number of bytes of the second SDU; . . . ; and the LI field of the last extended header indicates the number of bytes of the last but one SDU (only the first and the last RLC SDU can possibly be the segment). The padding field is used to cause the header to be integer bytes when the size of the entire header is non-integer bytes.

Figure 3D:
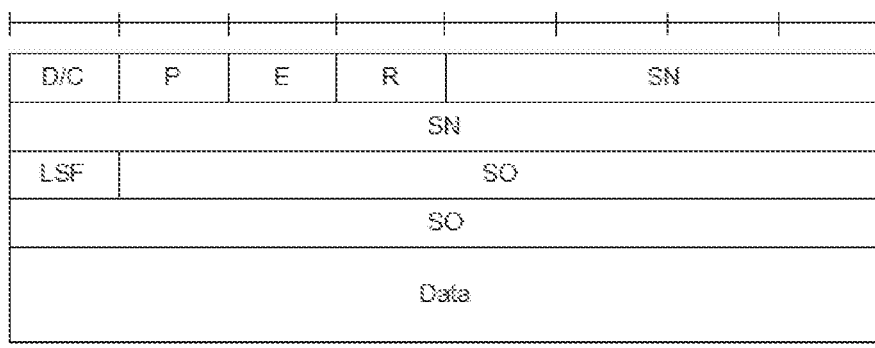

In some embodiments, when no cascade is performed as processing the SDU, the RLC entity indicates the segment situation of the data section by the SO field and the LSF field, and the RLC entity at this time can generate the packet header shown in FIG. 3D. In some embodiments, the E field is 0 for indicating that the data section is merely an SDU packet or SDU segment. FIG. 3D only takes the respective fields that are of the length and arranged in the order shown in the figure as an example. The length and order of the respective fields can be designed according to actual requirements, which is not limited in this embodiment.

In some embodiments, when the PDU packet needs to be re-segmented, only the data section of the PDU packet is re-segmented, and the segmented packet header is added according to the above rule, which will not be described again in this embodiment.

In the method for generating a PDU packet provided by this embodiment, a PDU packet including a packet header and a data section is generated, and the packet header omits the FI field and the RF field but includes the preset field, wherein the preset field is other fields than the FI field and the RF field already existing in the common packet header. In this way, the problem that the overhead occupied by the packet header of the PDU packet as generated in the related art is large can be solved, and an effect of directly omitting the FI field and the RF field, thereby reducing the length of the packet header and saving the overhead of the packet header can be achieved.

Figure 4A:
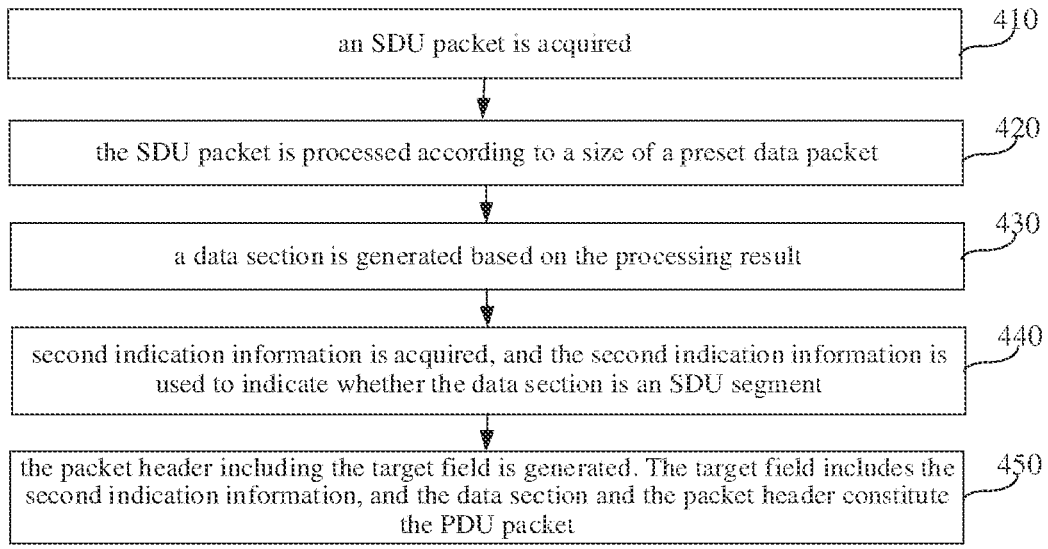
FIG. 4A is a flow chart of a method for generating a PDU packet according to a further exemplary embodiment of the present disclosure.

FIG. 4A is a flow chart of a method for generating a PDU packet according to another exemplary embodiment of the present disclosure. In this embodiment, a preset field including a target field that is newly added is taken as an example, and the method for generating a PDU packet can include following steps.

In step 410, an SDU packet is acquired.

In step 420, the SDU packet is processed according to a size of a preset data packet.

In step 430, a data section is generated based on the processing result.

Steps 410 to 430 are similar to steps 310 to 330 in the foregoing embodiment, and will not be described herein again.

In step 440, second indication information is acquired. When the SDU packet is not cascaded, the second indication information is used to indicate whether the data section is an SDU segment.

In some embodiments, if the SDU is not cascaded in step 420, the RLC entity detects whether the data section is an SDU segment and generates the second indication information according to the detection result.

In step 450, the packet header including the target field is generated. The target field includes the second indication information, and the data section and the packet header constitute the PDU packet.

In some embodiments, the target field can be a segmentation indication (SI) field. That is, the RLC entity can generate a packet header including the SI field, and the SI field including the second indication information. The target field is generally of 1 bit.

Figure 4B:
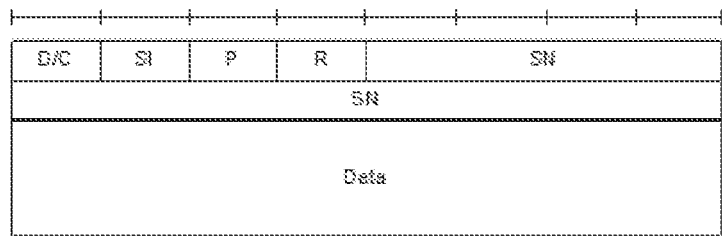
FIGS. 4B and 4C are schematic diagrams of a structure of a PDU packet according to further exemplary embodiments of the present disclosure.

In some embodiments, if the second indication information is not used to indicate the SDU segment, the RLC entity can generate the packet header including the SI field and omitting the SO field in the common packet header. Or, if the second indication information is not used to indicate the SDU segment, the RLC entity also can generate the packet header including the SI field and omitting the SO field and the LSF field in the common packet header. FIG. 4B is a schematic diagram of a structure of the generated PDU packet when the cascade is not performed, according to one exemplary embodiment.

Figure 4C:
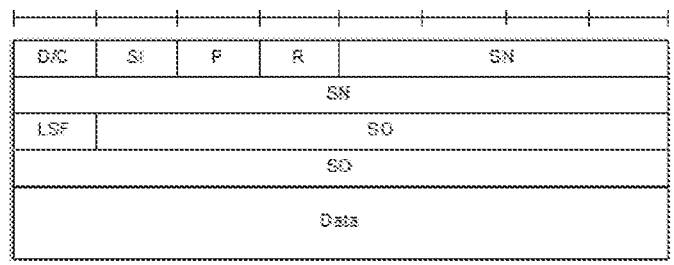

If the second indication information is used to indicate the SDU segment, the RLC entity can generate the packet header including the SI field. FIG. 4C is a schematic diagram of a structure of the generated PDU packet when the cascade is not performed, according to one exemplary embodiment.

The packet header omitting the FI field and the RF field in this embodiment will not be described herein again. Moreover, unless otherwise specified, the packet header can also include another field in the common packet header, which will not be described herein either.

The base station can configure whether the packet header includes the target field via radio resource control (RRC) configuration messages. Thus, when the packet header is configured to include the target field via the RRC configuration messages, a packet header including the target field is generated as generating the packet header, and when the packet header is configured to not include the target field via the RRC configuration messages, a packet header not including the target field is generated as generating the packet header. This embodiment does not limit thereto.

When the PDU packet needs resegmentation, the RLC can perform the resegmentation only on the data section of the PDU packet; and the encapsulation manner of the packet header is similar to that described above, and will not be described again in this embodiment.

In the method for generating a PDU packet provided by this embodiment, a PDU packet including a packet header and a data section is generated, and the packet header omits the FI field and the RF field but includes the preset field, wherein the preset field is a target field that is newly added and has a length smaller than the total length of the FT field and the RF field. In this way, the problem that the overhead occupied by the packet header of the PDU packet generated in the related art is large can be solved, and an effect of adding a target field having a shorter length while omitting the FT field and the RF field, thereby reducing the length of the packet header and saving the overhead of the packet header can be achieved.

Figure 5A:
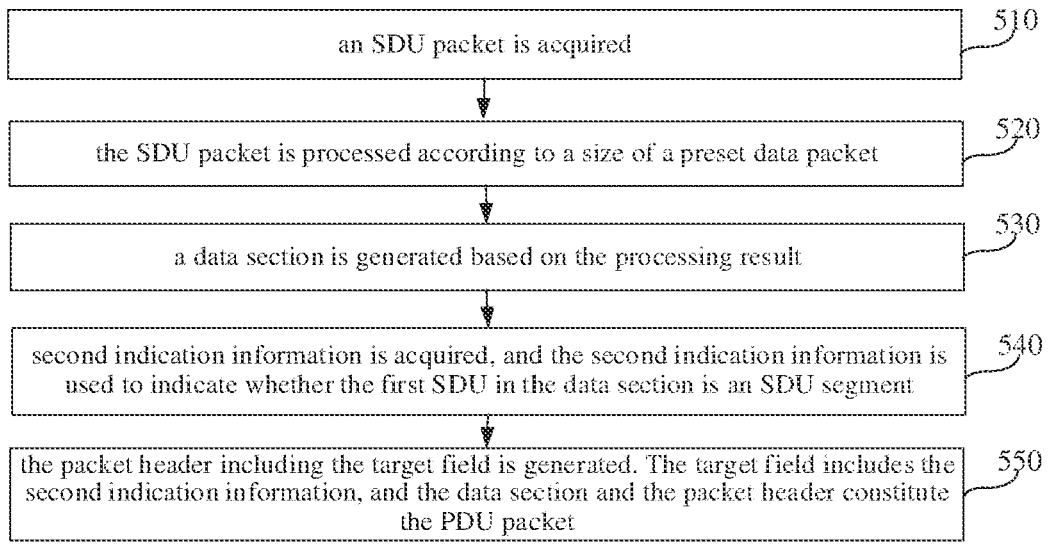
FIG. 5A is a flow chart of a method for generating a PDU packet according to an exemplary embodiment of the present disclosure.

As a variation of the previous embodiment, referring to FIG. 5A, the method shown in FIG. 5A is directed to a case where the SDU is cascaded when the SDU packet is processed. The method in FIG. 5A can include following steps.

In step 510, an SDU packet is acquired.

In step 520, the SDU packet is processed according to a size of a preset data packet.

In step 530, a data section is generated based on the processing result.

Steps 510 to 530 are similar to steps 410 to 430 in the foregoing embodiment, and will not be described herein again.

In step 540, second indication information is acquired. When the SDU packet is cascaded, the second indication information is used to indicate whether the first SDU in the data section is an SDU segment.

In some embodiments, if the SDU is cascaded in step 520, the RLC entity can detect whether the first SDU of the data section is SDU segment and generate the second indication information according to the detection result. For example, if the detection result is yes. "0" is generated, and if the detection result is no. "1" is generated. For example, in conjunction with FIG. 3B, the first SDU of the data section for the first PDU is a complete SDU, and the RLC entity generates "1" at this time; while for the second PDU, the first SDU of the data section is an SDU segment, and the RLC entity generates "0" at this time.

In step 550, the packet header including the target field is generated. The target field includes the second indication information, and the data section and the packet header constitute the PDU packet.

In some embodiments, the target field can be a segmentation indication (SI) field.

Figure 5B:
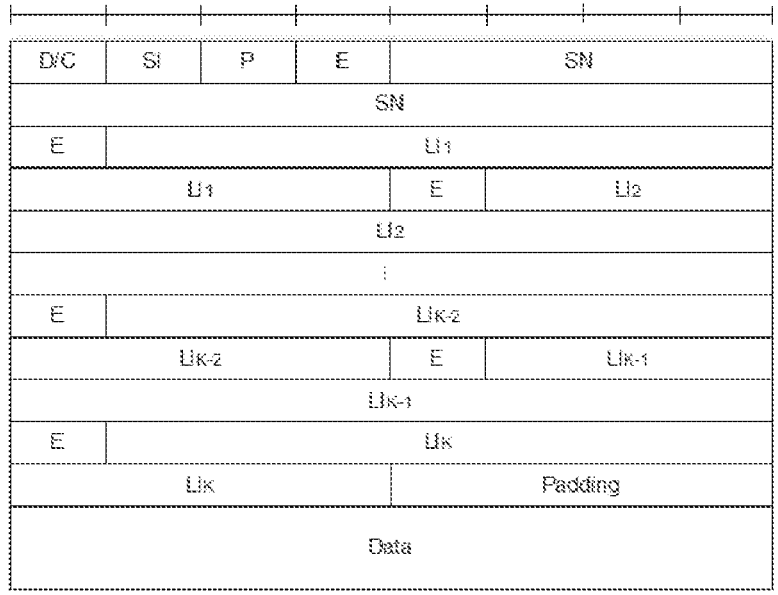
FIGS. 5B and 5C are schematic diagrams of a structure of a PDU packet according to exemplary embodiments of the present disclosure.

In some embodiments, if the second indication information is not used to indicate the SDU segment, the RLC entity can generate the packet header including the SI field and omitting the SO field in the common packet header. Or, if the second indication information is not used to indicate the SDU segment, the RLC entity also can generate the packet header including the SI field and omitting the SO field and the LSF field in the common packet header. FIG. 5B is a schematic diagram of a structure of the generated PDU packet when the cascade is performed, according to one exemplary embodiment.

Figure 5C:
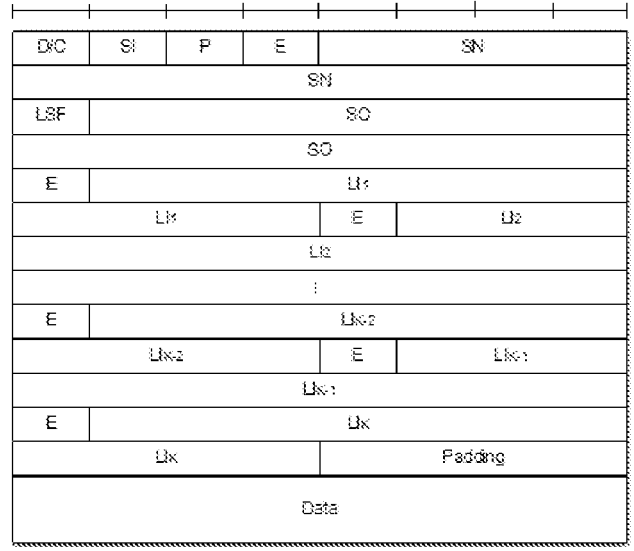

If the second indication information is used to indicate the SDU segment, the RLC entity can generate the packet header including the SI field. FIG. 5C is a schematic diagram of a structure of the generated PDU packet when the cascade is performed, according to one exemplary embodiment. In addition, in a case where the cascade is performed, the SN field, the LSF field, and the SO field in the packet header generated by the RLC entity can be similar to the foregoing embodiment, and will not be described herein again.

The packet header omitting the FI field and the RF field in this embodiment will not be described herein again. Moreover, unless otherwise specified, the packet header can also include another field in the common packet header, which will not be described herein either.

The manner in which the base station configures whether the packet header includes the target field via radio resource control (RRC) configuration messages can be similar to the foregoing embodiment and will not be described herein again.

When the PDU packet needs resegmentation, the RLC can perform the resegmentation only on the data section of the PDU packet; and the encapsulation manner of the packet header is similar to that described above, and will not be described again in this embodiment.

In the method for generating a PDU packet provided by this embodiment, a PDU packet including a packet header and a data section is generated, and the packet header omits the FI field and the RF field but includes the preset field, wherein the preset field is a target field that is newly added and has a length smaller than the total length of the FI field and the RF field. In this way, the problem that the overhead occupied by the packet header of the PDU packet generated in the related art is large can be solved, and an effect of adding a target field having a shorter length while omitting the FI field and the RF field, thereby reducing the length of the packet header and saving the overhead of the packet header can be achieved.

In the above embodiments, when the packet header includes the SO field, the length of the SO field is generally a preset fixed length, such as 2 bytes. For some low-rate services, the size of the PDU packet is often only of a few bytes, thus, the 2-byte SO field may be large with respect to the PDU packet, and thereby may waste a certain overhead of the header. At this time, the SO field can be optimized in length. The solution for optimizing the length of the SO field can include following three implementation modes.

In the first implementation mode, the step of generating a packet header can include the following.

Firstly, third indication information used to indicate whether the preset data packet is a small data packet is acquired; wherein, when the SDU is not cascaded, the preset data packet is the complete SDU packet corresponding to the SDU in the data section.

In some embodiments, the RLC entity can detect whether the size of the preset data packet is smaller than the preset size. If the detection result is yes, the third indication information, such as "1", indicating that the preset data packet is a small data packet is generated, and if the detection result is no, the third indication information, such as "0", indicating that the preset data packet is a large data packet is generated. The preset size can be a default size, such as 100 bytes, or a size configured by the base station via the RRC configuration messages when the method is used in the UE, which is not limited in this embodiment. When the preset size is the size configured by the base station, the preset size can be a size shared by all the data radio bearers (DRBs) or a size independently used by one DRB, which is not limited in this embodiment.

In some embodiments, if the SDU packet is not cascaded, the preset data packet is a complete SDU packet to which the SDU in the data section corresponds. In an embodiment, when the content in the data section is a complete SDU, the preset data packet is namely the SDU; and when the content in the data section is one SDU segment, for example, when one SDU packet is encapsulated in two PDU packets, the RLC entity acquires the SDU packet to which the SDU segment belongs and serves the acquired SDU package as the preset data packet.

Generally, the third indication information is of 1 bit.

Secondly, the packet header including the third indication information and the target SO field is generated as generating the packet header, when the third indication information is used to indicate that the preset data packet is a small data packet; wherein the length of the target SO field is smaller than the length of the SO field in the common packet header. For example, the length of the target SO field can be 7 bits.

In an embodiment, the RLC entity can generate the packet header that includes a small data (SD) field and a target SO field. The SD field includes the third indication information.

In an embodiment, when the third indication information is used to indicate that the preset data packet is a large data packet, the packet header including the SD field and the SO field is generated as generating the packet header, the length of the SO field being the preset length. The present length can be smaller than the length of the SO field in the common packet header, or can be equal to the length of the SO field in the common packet header, which is not limited in this embodiment.

In addition, in some embodiments, the length of the target SO field and the preset length can be the default length, or can be the length configured by the base station via the RRC configuration messages, which is not limited in this embodiment.

Furthermore, the base station can configure whether the packet header includes the SD field via the RRC configuration messages, and as generating the packet header, the packet header including the SD field can be generated only when the SD field is included in the packet header configured via the RRC configuration message, which is not limited in this embodiment.

When a small data packet is detected, the overhead occupied by the SO field can be saved by using the target SO field having a length smaller than the length of the SO field in the common packet header, which thereby achieves an effect of further saving the overhead occupied by the packet header.

In the second implementation mode, the step of generating a packet header can include the following.

Firstly, third indication information used to indicate whether the preset data packet is a small data packet is acquired; wherein, when the SDU is cascaded, the preset data packet is the complete SDU packet to which the first SDU in the data section corresponds.

In an embodiment, the RLC entity can detect whether the size of the preset data packet is smaller than the preset size and generate the third indication information according to the detection result. The generation manner of the third indication information can be similar as the previous implementation mode and will not be described again in this implementation mode.

In some embodiments, if the SDU packet is cascaded, the preset data packet is the complete SDU data packet to which the first SDU in the data section corresponds. In an embodiment, when the first SDU in the data section is a complete SDU, the preset data packet is namely the first SDU; and when the first SDU in the data section is an SDU segment, the RLC entity acquires the SDU packet to which the SDU segment belongs and serves the acquired SDU package as the preset data packet. Generally, the third indication information is of 1 bit.

Secondly, the packet header is generated according to the third indication information.

In some embodiments, the generation manner of the packet header can be similar as the previous implementation mode and will not be described again in this implementation mode.

In the third implementation mode, the step of generating packet header can include the following.

The packet header including the SO field having a target length is generated according to the RRC configuration messages that are historically acquired. The RRC configuration messages include the target length, and the target length is smaller than a length of the SO field in the common packet header.

When the base station performs DRB configuration to the UE via the RRC configuration messages, the RRC configuration messages include the target length, such as, 7 bits. In some embodiments, the target length included in the RRC configuration messages can also be other lengths, which is not limited in this embodiment.

Thereafter, as generating the packet header, the packet header including the SO field having the target length can be generated according to the target length configured in the RRC configuration messages.

By configuring a preset length smaller than the length of the SO field in the common packet header, the base station enables the RLC entity to generate the packet header including the SO field having the preset length as generating the packet header, thereby reducing the overhead occupied by the packet header.

In addition, when the RLC entity does not have the cascade function, the RLC entity can disable the function of segmenting the small data packet in this embodiment since a certain amount of processing resources are required to segment the small data. In some embodiments, it can include the following.

Firstly, the RRC configuration message transmitted by the receiving end is acquired, and the RRC configuration message is used to disable the segment function for segmenting the SDU packet.

The base station transmits RRC configuration messages to configure the UE DRB, and disables the segment function of the RLC in the RLC configuration of the DRB. In some embodiments, the configuration can be performed separately or uniformly for uplink and downlink, and it can be performed both under UM and DM. Of course, the RRC configuration message can also be configured to not disable the segment function, which is not limited herein.

Secondly, the segment function for segmenting the SDU packet is disabled.

Figure 6A:
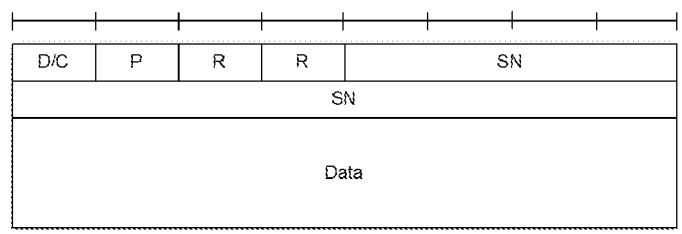
FIG. 6A is a schematic diagram of a structure of a PDU packet according to one exemplary embodiment of the present disclosure.

After receiving the RRC configuration messages, when the RRC configuration messages indicate disabling the segment function for the uplink, the RLC entity does not segment the received SDU packet as transmitting the data; and referring to FIG. 6A, the data can be transmitted using the PDU packet format that is not segmented. However, when the RRC configuration messages indicate disabling the segment function for the downlink, the RLC entity, after receiving the PDU packet transmitted by the opposite end, can know that the PDU packet is an SDU packet that is not segmented.

For small data services, the base station can configure the RLC entity to disable the segment function, which reduces the complex operations required by the RLC entity to process the small data packet and improves the data transmission efficiency of the RLC entity.

Figure 6B:
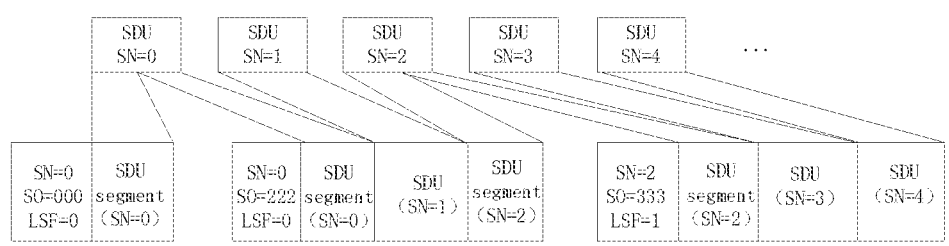
FIG. 6B is a schematic diagram of acquiring a PDU packet after processing an SDU packet according to one exemplary embodiment of the present disclosure.

In the foregoing embodiments, after the RLC entity processes the SDU packet, the SN numbers in the generated PDU packet may not be consecutive. For example, referring to FIG. 6B, the RLC entity receives five SDU packets with SNs of 0, 1, 2, 3, and 4 respectively, and then the RLC entity encapsulates the first segment of the SDU packet of SN=0 in the first PDU packet, the second segment of the SDU packet of SN=0, the SDU packet of SN=1, and the first segment of the SDU packet of SN=2 in the second PDU packet, and the second segment of the SDU packet of SN=2 and the SDU packet of SN=3 and SN=4 in the third PDU packet. Still referring to FIG. 6B, the SN numbers of the three PDU packets acquired by the RLC entity are sequentially 0, 0, and 2, which are not consecutive. At this time, in order to confirm whether each of the acquired PDU packets includes the repeated content, the RLC entity can detect whether the SN numbers are consecutive according to the SN field and the SO field in each of the acquired PDU packets. For example, taking the first PDU packet and the second PDU packet as an example in conjunction with FIG. 6B, the RLC entity can detect whether the last byte of the first PDU packet is the $(LSF-1)^{th}$ byte, namely, the $221^{th}$ byte, of the second PDU packet. When the detection result is yes, the RLC entity can determine that the SDU packet of SN=0 has no problem in encapsulate repetition. And in order to confirm whether SDU packet loss has occurred in each of the acquired PDU packets, the RLC entity can detect whether n+m is equal to N, where n is the SN number of the SDU packet corresponding to the last byte that is included in the PDU packet where the interruption begins, m is the SN number of the PDU packet where the interruption begins, and N is the SN number of the PDU packet where the interruption ends. If the detection result is yes, it is determined that no packet loss occurs, and if the detection result is no, it is determined that the packet loss occurs. For example, in conjunction with FIG. 6B, the SN number of the second PDU packet is 0, and the SN number of the third PDU packet is 2. The two are not consecutive, thus, at this time, the RLC entity can calculate the sum (2) of the SN number (namely, 2) of the SDU packet to which the last byte of the second PDU packet corresponds and the SN number (namely, 0) of the second PDU packet, and further detect whether the calculated sum is equal to the SN number (2) of the third PDU packet; and since the detection result of the RLC entity is yes, the RLC entity can determine that no packet loss occurs.

Figure 7:
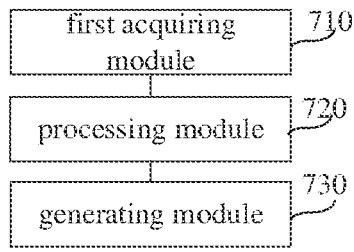
FIG. 7 is a schematic diagram of a device for generating a PDU packet according to one exemplary embodiment of the present disclosure.

FIG. 7 is a schematic diagram of a device for generating a PDU packet according to one exemplary embodiment of the present disclosure. As shown in FIG. 7, the device for generating a PDU packet can include: a first acquiring module 710, a processing module 720 and a generating module 730.

The first acquiring module 710 is configured to acquire a service data unit (SDU) packet; the processing module 720 is configured to process the SDU packet according to a size of a preset data packet; and the generating module 730 is configured to generate a packet header and a data section of a PDU packet according to a processing result of the processing module 720, the packet header and the data section constituting the PDU packet; wherein the packet header omits a framing indication (FI) field and a resegmentation flag (RF) field but comprises a preset field, and the preset field comprises other fields than the FI field and the RF field that are redefined in a common packet header, or a target field that is newly added, the field length of the target field that is newly added being smaller than the total length of the FI field and the RF field.

In the device for generating a PDU packet provided by this embodiment, a PDU packet including a packet header and a data section is generated, and the packet header omits the FI field and the RF field but includes the preset field, wherein the preset field is other fields than the FI field and the RF field already existing in the common packet header or a target field that is newly added and has a length smaller than the total length of the FI field and the RF field. In this way, the problem that the overhead occupied by the packet header of the PDU packet as generated in the related art is large can be solved, and an effect of directly omitting the FI field and the RF field or adding a target field having a shorter length while omitting the FI field and the RF field, thereby reducing the length of the packet header and saving the overhead of the packet header can be achieved.

Figure 8:
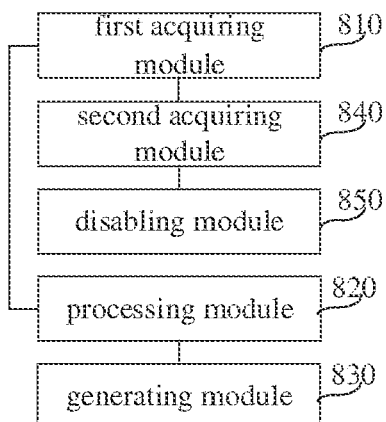
FIG. 8 is a schematic diagram of a device for generating a PDU packet according to another exemplary embodiment of the present disclosure.

FIG. 8 is a schematic diagram of a structure of a device for generating PDU packet shown according to one exemplary embodiment of the present disclosure. As shown in FIG. 8, the device for generating PDU packet can include: a first acquiring module 810, a processing module 820 and a generating module 830.

The first acquiring module 810 is configured to acquire a service data unit (SDU) packet; the processing module 820 is configured to process the SDU packet according to a size of a preset data packet; and the generating module 830 is configured to generate a packet header and a data section of a PDU packet according to a processing result of the processing module 820, the packet header and the data section constituting the PDU packet; wherein the packet header omits a framing indication (FI) field and a resegmentation flag (RF) field but comprises a preset field, and the preset field comprises a target field that is newly added, the field length of the target field that is newly added being smaller than the total length of the FI field and the RF field.

The generating module 830 is further configured to: acquire second indication information, wherein when the SDU packet is not cascaded, the second indication information is used to indicate whether the data section is an SDU segment; and generate the packet header that comprises the target field, the target field comprising the second indication information.

In an embodiment, the generating module 830 is further configured to: generate the packet header that comprises the target field but omits the SO field in the common packet header when the second indication information is used to indicate not the SDU segment, or generate the packet header that comprises the target field but omits the SO field and the LSF field in the common packet header when the second indication information is used to indicate not the SDU segment.

In an embodiment, the generating module 830 is further configured to: generate the packet header that comprises the target field when radio resource control (RRC) configuration messages that are acquired historically are used to configure the packet header to comprise the target field.

In an embodiment, the generating module 830 is further configured to: acquire third indication information that is used to indicate whether the preset data packet is a small data packet, wherein when the SDU is not cascaded, the preset data packet is a complete SDU packet to which the SDU in the data section corresponds; and generate the packet header that comprises the third indication information and the target SO field when the third indication information is used to indicate that the preset data packet is a small data packet, the length of the target SO field being smaller than the length of the SO field in the common packet header.

In an embodiment, the generating module 830 is further configured to: generate the packet header that comprises the third indication information and the target SO field when the RRC configuration messages that are acquired historically are used to configure the packet header to comprise the third indication information.

In an embodiment, the generating module 830 is further configured to: generate the packet header comprising the SO field having a target length according to the RRC configuration messages that are historically acquired, wherein the RRC configuration messages comprise the target length that is smaller than a length of the SO field in the common packet header.

In an embodiment, the device further comprises: a second acquiring module 840, configured to acquire the RRC configuration messages transmitted by the receiving end before the generating module 830 generates the packet header of the PDU packet according to the processing result, the RRC configuration messages being used to disable a segment function for segmenting the SDU packet; and a disabling module 850, configured to disable the segment function for segmenting the SDU packet after receiving the RRC configuration messages.

In the device for generating a PDU packet provided by this embodiment, a PDU packet including packet header and data section is generated, and the packet header omits the FI field and the RF field but includes the preset field, wherein the preset field is a target field that is newly added and has a length smaller than the total length of the FI field and the RF field. In this way, the problem that the overhead occupied by the packet header of the PDU packet as generated in the related art is large can be solved, and an effect of adding a target field having a shorter length while omitting the FI field and the RF field, thereby reducing the length of the packet header and saving the overhead of the packet header can be achieved.

Figure 9:
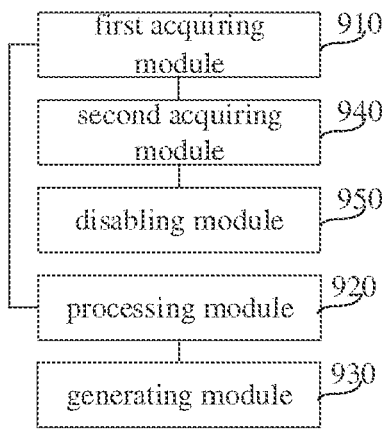
FIG. 9 is a schematic diagram of a device for generating a PDU packet according to a further exemplary embodiment of the present disclosure.

As a variation of the previous embodiment, referring to FIG. 9, the device shown in FIG. 9 is directed to a case where the SDU is cascaded when the SDU packet is processed. As shown in FIG. 9, the device for generating a PDU packet can include: a first acquiring module 910, a processing module 920, a generating module 930, a second acquiring module 940 and a disabling module 950. Wherein, the functions of the first acquiring module 910, the processing module 920, the second acquiring module 940 and the disabling module 950 is respectively similar to the first acquiring module 810, the processing module 820, the second acquiring module 840 and the disabling module 850 of the previous embodiment and will not be described again in this embodiment.

The difference between this embodiment and the previous embodiment as follows.

The generating module 930 is configured to generate a packet header and a data section of a PDU packet according to a processing result of the processing module 920, and the packet header and the data section constituting the PDU packet; wherein the packet header omits a framing indication (FI) field and a resegmentation flag (RF) field but comprises a preset field, and the preset field comprises other fields than the FI field and the RF field that are redefined in a common packet header, or a target field that is newly added and has a length smaller than the total length of the FI field and the RF field.

In an embodiment, the other fields comprise a sequence number (SN) field, a last segment flag (LSF) field, and a segmentation offset (SO) field.

When the SDU packet is cascaded, the generating module 930 is further configured to: acquire SN number to which a first SDU packet of the data section corresponds; acquire first indication information that is used to indicate whether a last byte of the data section is a last byte of a last SDU; acquire a starting byte position of a first byte of the data section correspondingly in the SDU packet; and generate the packet header that comprises the SN field, the LSF field and the SO field, the SN field comprising the acquired SN number, the LSF field comprising the acquired first indication information, and the SO field comprising the acquired starting byte position.

In an embodiment, the preset field comprises the target field that is new added.

The generating module 930 is further configured to: acquire second indication information, wherein when the SDU packet is cascaded, the second indication information is used to indicate whether a first SDU in the data section is an SDU segment; and generate the packet header that comprises the target field, the target field comprising the second indication information.

The generating module 930 is further configured to: generate the packet header that comprises the target field but omits the SO field in the common packet header when the second indication information is used to indicate not the SDU segment, or generate the packet header that comprises the target field but omits the SO field and the LSF field in the common packet header when the second indication information is used to indicate not the SDU segment.

In an embodiment, the generating module 930 is further configured to: generate the packet header that comprises the target field when radio resource control (RRC) configuration messages that are acquired historically are used to configure the packet header to comprise the target field.

In an embodiment, the generating module 930 is further configured to: acquire third indication information that is used to indicate whether the preset data packet is a small data packet, wherein when the SDU is cascaded, the preset data packet is a complete SDU packet to which the first SDU in the data section corresponds; and generate the packet header that comprises the third indication information and the target SO field when the third indication information is used to indicate that the preset data packet is a small data packet, the length of the target SO field being smaller than the length of the SO field in the common packet header.

In an embodiment, the generating module 930 is further configured to: generate the packet header that comprises the third indication information and the target SO field when the RRC configuration messages that are acquired historically are used to configure the packet header to comprise the third indication information.

In an embodiment, the generating module 930 is further configured to: generate the packet header comprising the SO field having a target length according to the RRC configuration messages that are historically acquired, wherein the RRC configuration messages comprise the target length that is smaller than a length of the SO field in the common packet header.

In summary, for the device for generating PDU packet provided by this embodiment, a PDU packet including packet header and data section is generated, and the packet header omits the FI field and the RF field but includes the preset field, wherein the preset field comprises other fields than the FI field and the RF field that are redefined in a common packet header, or a target field that is newly added and has a length smaller than the total length of the FI field and the RF field. In this way, the problem that the overhead occupied by the packet header of the PDU packet as generated in the related art is large can be solved, and an effect of directly omitting the FI field and the RF field or adding a target field having a shorter length while omitting the FI field and the RF field, thereby reducing the length of the packet header and saving the overhead of the packet header can be achieved.

There is provided a device for generating a PDU packet according to one exemplary embodiment of the present disclosure, and the method for generating a PDU packet provided by the present disclosure can be implemented by the device. The device for generating a PDU packet comprises a processor; and a memory for storing a processor-executable instruction, wherein the processor is configured to: acquire a service data unit (SDU) packet; process the SDU packet according to a size of a preset data packet; and generate a packet header and a data section of the PDU packet according to a processing result, the packet header and the data section constituting the PDU packet; wherein the packet header omits a framing indication (FI) field and a resegmentation flag (RF) field but comprises a preset field, and the preset field comprises other fields than the FI field and the RF field that are redefined in a common packet header, or a target field that is newly added, the field length of the target field that is newly added being smaller than the total length of the FI field and the RF field.

Figure 10:
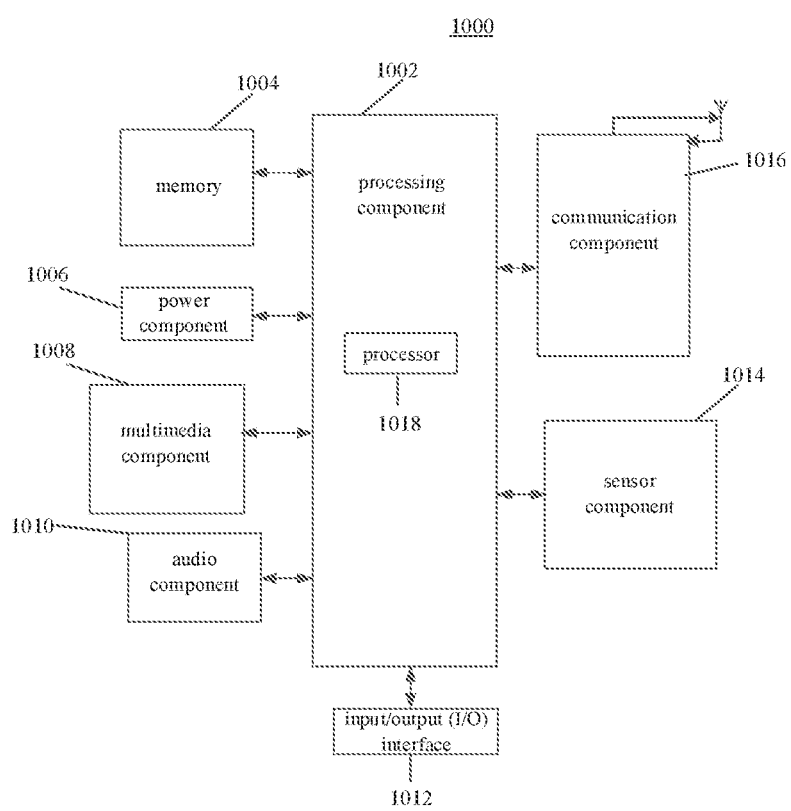
FIG. 10 is a schematic diagram of an apparatus for generating a PDU packet according to one exemplary embodiment of the present disclosure.

FIG. 10 is a schematic diagram of an apparatus 1000 for generating a PDU packet according to one exemplary embodiment of the present disclosure. The apparatus 1000 may be implemented as all or part of the UE.

Referring to FIG. 10, the apparatus 1000 can include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls the overall operations of the apparatus 1000, such as the operations associated with display, telephone calls, data communications, camera operations, and recording operations. The processing component 1002 may include one or more processors 1018 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any applications or methods operated on the apparatus 1000, contact data, phonebook data, messages, pictures, videos, etc. The memory 1004 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the apparatus 1000. The power component 1006 may include a power management system, one or more power sources, and any other components associated with the generation, management, and distribution of power in the apparatus 1000.

The multimedia component 1008 includes a screen providing an output interface between the apparatus 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1008 includes a front camera and/or a rear camera. The front camera and the rear camera may receive external multimedia data while the apparatus 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone (MIC) configured to receive external audio signals when the apparatus 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and peripheral interface modules, such as a keyboard, a click wheel, buttons, and the like. The buttons may include, but are not limited to, a home button, a volume button, a start button, and a lock button.

The sensor component 1014 includes one or more sensors to provide status assessments of various aspects of the apparatus 1000. For instance, the sensor component 1014 may detect an on/off status of the apparatus 1000, relative positioning of components. e.g., the display device and the mini keyboard of the apparatus 1000, and the sensor component 1014 may also detect a position change of the apparatus 1000 or a component of the apparatus 1000, presence or absence of user contact with the apparatus 1000, orientation or acceleration/deceleration of the apparatus 1000, and temperature change of the apparatus 1000. The sensor component 1014 may include a proximity sensor configured to detect the presence of nearby objects without any physical contact. The sensor component 1014 may also include a light sensor, such as a CMOS or CCD image sensor, used for imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the apparatus 1000 and other devices. The apparatus 1000 can access a wireless network based on a communication standard, such as WiFi, 2G, or 3G, or a combination thereof. In an exemplary embodiment, the communication component 1016 receives broadcast signals or broadcast associated information from an external broadcast management system via a broadcast channel. In an exemplary embodiment, the communication component 1016 further includes a near field communication (NFC) module to facilitate short-range communications.

In exemplary embodiments, the apparatus 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium having stored therein instructions is also provided, such as—the memory 1004 having stored therein instructions, executable by the processor 1018 in the apparatus 1000, for performing the above-described methods. For example, the non-transitory computer-readable storage medium may be a ROM, a RAM, a CD-ROM, a magnetic tape, a floppy disc, an optical data storage device, and the like.

In some embodiments, the PDU package generating device may be of other structures, which is not limited in the present embodiment.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for generating a protocol data unit (PDU) packet, comprising:
    acquiring a service data unit (SDU) packet;
    processing the SDU packet according to a size parameter; and
    generating a packet header and a data section of a PDU packet according to a processing result, the packet header and the data section constituting the PDU packet, wherein the packet header omits a framing indication (FI) field and a resegmentation flag (RF) field and comprises a preset field, and the preset field comprises a target field that is newly added, a field length of the target field that is newly added being smaller than a total length of the FI field and the RF field,
    wherein generating the packet header and the data section of the PDU packet according to the processing result comprises:
    in response to that the data section does not comprise an SDU segment, generating the packet header that comprises the target field and omits a segmentation offset (SO) field.

2. The method according to claim 1, wherein the target field comprises indication information for indicating that the data section does not comprise an SDU segment.

3. The method according to claim 1, wherein the packet header comprises indication information for indicating whether the data section comprises an SDU segment.

4. The method according to claim 1, wherein generating the packet header that comprises the target field comprises:
    generating the packet header that comprises the target field when radio resource control (RRC) configuration messages that are acquired historically are used to configure the packet header to comprise the target field.

5. The method according to claim 1, wherein generating the packet header of the PDU packet according to the processing result further comprises:

acquiring indication information that is used to indicate whether the preset data packet is a small data packet, wherein the preset data packet is a complete SDU packet to which the SDU in the data section corresponds; and generating the packet header that comprises the indication information and a target SO field when the indication information is used to indicate that the preset data packet is a small data packet, a length of the target SO field being smaller than a length of an SO field in a common packet header.

6. The method according to claim 1, wherein the packet header comprises indication information and a target SO field in response to that the data section is a complete SDU segment.

7. The method according to claim 1, wherein generating the packet header of the PDU packet according to the processing result further comprises:

generating the packet header that comprises a segmentation offset (SO) field having a target length according to RRC configuration messages that are historically acquired, wherein the RRC configuration messages comprise the target length that is smaller than a length of the SO field in a common packet header.

8. The method according to claim 2, wherein generating the packet header of the PDU packet according to the processing result further comprises:

generating the packet header that comprises a segmentation offset (SO) field having a target length according to RRC configuration messages that are historically acquired, wherein the RRC configuration messages comprise the target length that is smaller than a length of the SO field in a common packet header.

9. The method according to claim 1, wherein when no cascade function is used, the method further comprises:

acquiring RRC configuration messages transmitted by a receiving end, the RRC configuration message being used to disable a segment function for segmenting the SDU packet; and disabling the segment function for segmenting the SDU packet after receiving the RRC configuration messages.

10. A device for generating a protocol data unit (PDU) packet, comprising:

a processor; and a memory for storing a processor-executable instruction, wherein the processor is configured to:

acquire a service data unit (SDU) packet;

process the SDU packet according to a size parameter; and generate a packet header and a data section of a PDU packet according to a processing result, the packet header and the data section constituting the PDU packet, wherein the packet header omits a framing indication (FI) field and a resegmentation flag (RF) field and comprises a preset field, and the preset field comprises a target field that is newly added, a field length of the target field that is newly added being smaller than a total length of the FI field and the RF field, wherein in generating the packet header and the data section of the PDU packet according to the processing result, processor is further configured to:

in response to that the data section does not comprise an SDU segment, generate the packet header that comprises the target field and omits a segmentation offset (SO) field.

11. The device according to claim 10, wherein the target field comprises indication information for indicating that the data section does not comprise an SDU segment.

12. The device according to claim 10, wherein the packet header comprises indication information for indicating whether the data section comprises an SDU segment.

13. The device according to claim 10, wherein the processor is further configured to:

generate the packet header that comprises the target field when radio resource control (RRC) configuration messages that are acquired historically are used to configure the packet header to comprise the target field.

14. The device according to claim 10, wherein the processor is further configured to:

acquire indication information that is used to indicate whether the preset data packet is a small data packet, wherein the preset data packet is a complete SDU packet to which the SDU in the data section corresponds; and generate the packet header that comprises the indication information and a target SO field when the indication information is used to indicate that the preset data packet is a small data packet, a length of the target SO field being smaller than a length of an SO field in a common packet header.

15. The device according to claim 10, wherein the packet header comprises indication information and a target SO field in response to that the data section is a complete SDU segment.

16. The device according to claim 10, wherein the processor is further configured to generate the packet header comprising a segmentation offset (SO) field having a target length according to RRC configuration messages that are historically acquired, wherein the RRC configuration messages comprise the target length that is smaller than a length of the SO field in a common packet header.

17. The device according to claim 11, wherein the processor is further configured to:

generate the packet header comprising a segmentation offset (SO) field having a target length according to RRC configuration messages that are historically acquired, wherein the RRC configuration messages comprise the target length that is smaller than a length of the SO field in a common packet header.

18. The device according to claim 11, wherein when no cascade function is used, the processor is further configured to:

acquire RRC configuration messages transmitted by a receiving end before generating the packet header of the PDU packet according to the processing result, the RRC configuration messages being used to disable a segment function for segmenting the SDU packet; and disable the segment function for segmenting the SDU packet after receiving the RRC configuration messages.

* * * * *